Patented May 4, 1948

2,441,119

UNITED STATES PATENT OFFICE 2,441,119

COPPER OXIDE RECTIFIER ELEMENT

Ezio Thomas Casellini, Salem, and Laurence Burns, Swampscott, Mass., assignors to Sylvania Electric Products Inc., Salem, Mass., a corporation of Massachusetts No Drawing. Application February 25, 1946, Serial No. 650,120

3 Claims. (Cl. 175—366)

This invention relates to barrier layer rectifiers, such as copper oxide rectifiers, and to processes and apparatus for making them.

Copper oxide rectifiers have heretofore been made by heating a copper blank in air at high temperature, thus forming not only an inner useful cuprous oxide layer, but also an outer and unwanted cupric oxide layer, which had to be afterward removed by mechanical or chemical means. Our invention enables direct production of the cuprous oxide layer without the accompanying formation of a covering cupric oxide layer. A cuprous layer of a desired thickness can be directly formed by our invention, and weakening or deterioration of the cuprous layer by the apparatus or chemicals used to remove the cupric layer is avoided.

A rectifier layer of new purity and strength is thus provided, and a rectifier of improved characteristics.

In following our invention, a copper blank, which may be in the annular ring or "washer" form usual in the art, or in any other desirable form, may be heated at about 1050° C. in an atmosphere of carbon dioxide for several minutes or until a cuprous oxide layer of the desired thickness is formed. The heating may be done in an electric furnace, and the carbon dioxide fed into it from a tank. The temperature may be in the neighborhood of 1000° C. It should be at or above the temperature at which the oxidizing reaction begins to occur, but, of course, below the melting temperature of the copper blank used.

The oxidized blank may then be cooled in the same atmosphere, or if desired, in an inert atmosphere such as nitrogen. Oxidation will cease when the temperature drops below that necessary for the reaction. The blank may be cooled slowly, or quenched, depending on the characteristic desired. Usually, the blank may be brought first to an intermediate temperature, such as 600° C., and annealed then for a while in the carbon dioxide, or in an inert atmosphere, then being cooled to room temperature in the same atmosphere. This may be done by quenching, if desired, but we prefer to cool it somewhat more slowly.

Instead of an atmosphere of carbon dioxide, an otherwise inert atmosphere containing a very small percentage of gaseous oxygen may be used, for example, nitrogen with an oxygen content even less than 1%. In this case, however, the oxidizing reaction will continue on cooling, if the same atmosphere is used, whereas with carbon dioxide it will cease below a definite reaction temperature.

Where the carbon dioxide is not heated inductively at high frequency, a small percentage of oxygen, say less than 1%, may be mixed with the gas to aid in the reaction. This is not important if the blank is heated by a high frequency induction coil.

What we claim is:

1. The method of making a copper oxide rectifier element, said method comprising oxidizing a copper blank to high temperature in an atmosphere of carbon dioxide.

2. The method of making a copper oxide rectifier element said method comprising oxidizing a copper blank to between 800 and 1050° C. in an atmosphere of carbon dioxide to form a layer of red cuprous oxide.

3. The method of claim 2, and the step of cooling the oxidized blank in an atmosphere of carbon dioxide.

EZIO THOMAS CASELLINI.
LAURENCE BURNS.

REFERENCES CITED

The following references are of record in the file of this patent:

UNITED STATES PATENTS

| Number | Name | Date |
|---|---|---|
| 2,320,962 | Wilson | June 1, 1943 |

FOREIGN PATENTS

| Number | Country | Date |
|---|---|---|
| 115,729 | Australia | Aug. 13, 1942 |